United States Patent [19]

Cole et al.

[11] Patent Number: 4,500,229

[45] Date of Patent: Feb. 19, 1985

[54] METHOD AND APPARATUS FOR FORMING CYLINDRICAL ARTICLES INTO A SINGLE LINE

[75] Inventors: Rodger E. Cole, Golden; Richard H. Vander Meer, Arvada, both of Colo.

[73] Assignee: Goldco Engineering, Inc., Golden, Colo.

[21] Appl. No.: 366,749

[22] Filed: Apr. 8, 1982

[51] Int. Cl.³ .................................. B65G 51/02
[52] U.S. Cl. ........................................ 406/88
[58] Field of Search ............... 198/347, 457; 406/86, 406/88; 414/676

[56] References Cited

U.S. PATENT DOCUMENTS 4,182,586  1/1980  Lenhart .................................. 406/88
4,347,022  8/1982  Lenhart .................................. 406/88

FOREIGN PATENT DOCUMENTS 2038264  7/1980  United Kingdom .................. 406/86
2061856  5/1981  United Kingdom .................. 406/88

Primary Examiner—Jeffrey V. Nase
Assistant Examiner—Jon M. Rastello
Attorney, Agent, or Firm—O'Rourke & Harris

[57] ABSTRACT

Method and apparatus for forming bulk conveyed or stored cylindrical articles, such as thin walled cans, into a single file conveyed row the apparatus being formed of two preferably mirror imaged perforated plate members spaced apart a slightly greater distance than the height of the articles being conveyed, but less than the diagonal dimension thereof the perforated plate members having plenum portions adapted to exhaust air through angled openings primarily in the direction of a peripheral guide member, but with the openings adjacent the guide member being angled in a direction substantially parallel to the guide member in order that the cans may be conveyed along the guide member in a single file fashion with articles not single filed being split away from the single file row and displaced towards the portion of the spaced plates having angled openings directed towards the guide member.

10 Claims, 5 Drawing Figures

METHOD AND APPARATUS FOR FORMING CYLINDRICAL ARTICLES INTO A SINGLE LINE

BACKGROUND OF THE INVENTION

1. Field of the Invention

The present invention relates generally to article handling, and more particularly to a simple and advantageous apparatus for arranging cylindrical articles randomly spaced on a mass conveyor or storage means into a single file column of such articles while repositioning such articles as are not initially formed into the single file into a position to be merged into the single file arrangement.

2. Description of the Prior Art

Articles, such as cylindrical containers, are produced by high speed, mass production machinery. Because of the high rate of production, it is necessary to treat, test, inspect, etc. the articles in a highly automated fashion. Particularly in the case of production of thin walled cans for the containment of food or beverages, it is necessary to carefully inspect each item for imperfections, either functional or structural, as well as to print and otherwise perform operations upon an individual container after formation. As a result of the extremely high production rates, it is often convenient to mass convey the containers, i.e. on broad belts or other conveying means capable of concurrently conveying a transverse row. However, in a number of inspection, treating, etc. operations, it is necessary that the containers be single lined in order that the container proceed in single file so that each may be sequentially presented to the various operations.

A typical example of known single lining or single filing devices is to be found in U.S. Pat. No. 4,182,586 issued Jan. 8, 1980. In this device, the bulk cans are cascaded vertically downward while in a position with the can axis horizontally oriented to be formed into a single line. Cans are blown upward to form the single line to avoid jamming. However, the patented device relies upon a vertical transfer and presentation of the cans in a horizontal position. Such requirements can not always be conveniently met in actual operation.

SUMMARY OF THE INVENTION

The present invention, which provides for a heretofore unavailable means of forming bulk transported cylindrical articles into a single line arrangement utilizes a pair of vertically spaced perforated plates having angled outlets to urge the bulk cans into a single line arrangement along a peripheral barrier, and our flow means to recycle such articles as are not properly formed into a single line upon the initial pass. More specifically, the perforated plates include a plurality of angled outlets with the outlets adjacent the peripheral barrier being substantially parallel or tangent to the barrier to convey the single line of cans, and the remainder of outlets being angled to convey air from adjacent plenums in such a manner as to form delined articles into a single line, or to recirculate such articles as are not initially formed into the appropriate single line either as a result of a temporary high delivery rate, or by bulking of the cans. The area spaced from the peripheral barrier serves as a dynamic storage area with the articles being moved and circulated for presentation adjacent the barrier for appropriate single line conveying in single file form.

Accordingly, an object of the present invention is to provide a new and improved apparatus and method for forming bulk conveyed articles into a single line arrangement.

Another object of the present invention is to provide an apparatus and method for stabilizing bulk made articles while being stored and formed into a single line arrangement.

Yet another object of the present invention is to provide a new and improved method and apparatus for forming bulk transported articles into single line arrangement while maintaining the articles in a vertical arrangement.

These and other objects of the invention will become apparent from the following drawings.

DETAILED DESCRIPTION OF THE INVENTION

Figure 1:
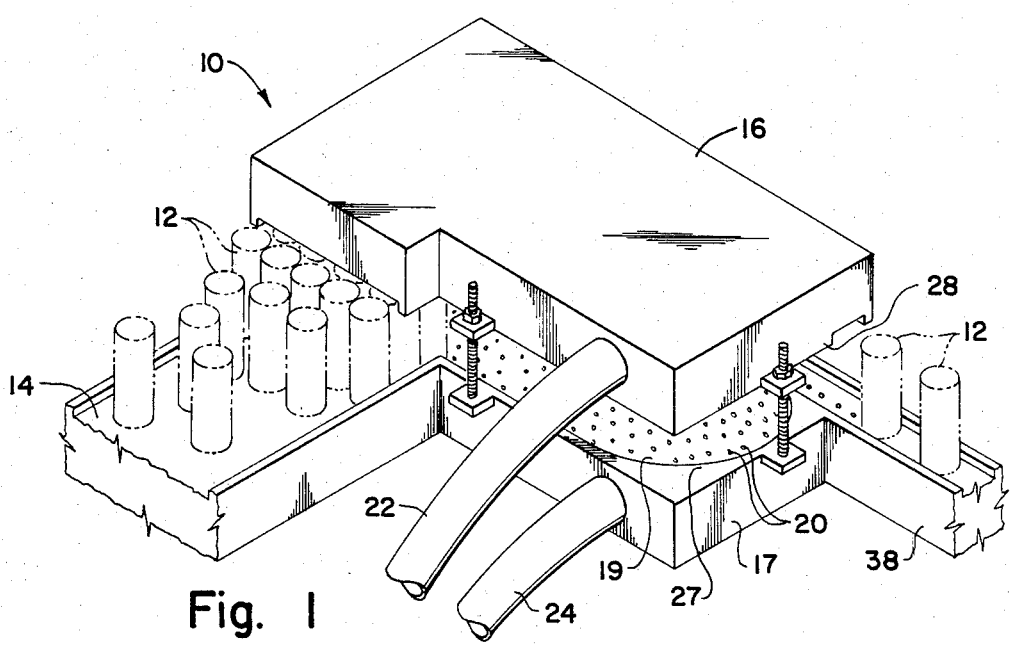
FIG. 1 is a perspective view of an apparatus according to the instant invention.

Turning now to the drawings wherein like components are designated by like reference numerals throughout the various figures, an apparatus for forming single line arrangements of bulk conveyed articles is illustrated in FIG. 1 and generally designated by reference numeral 10.

Figure 2:
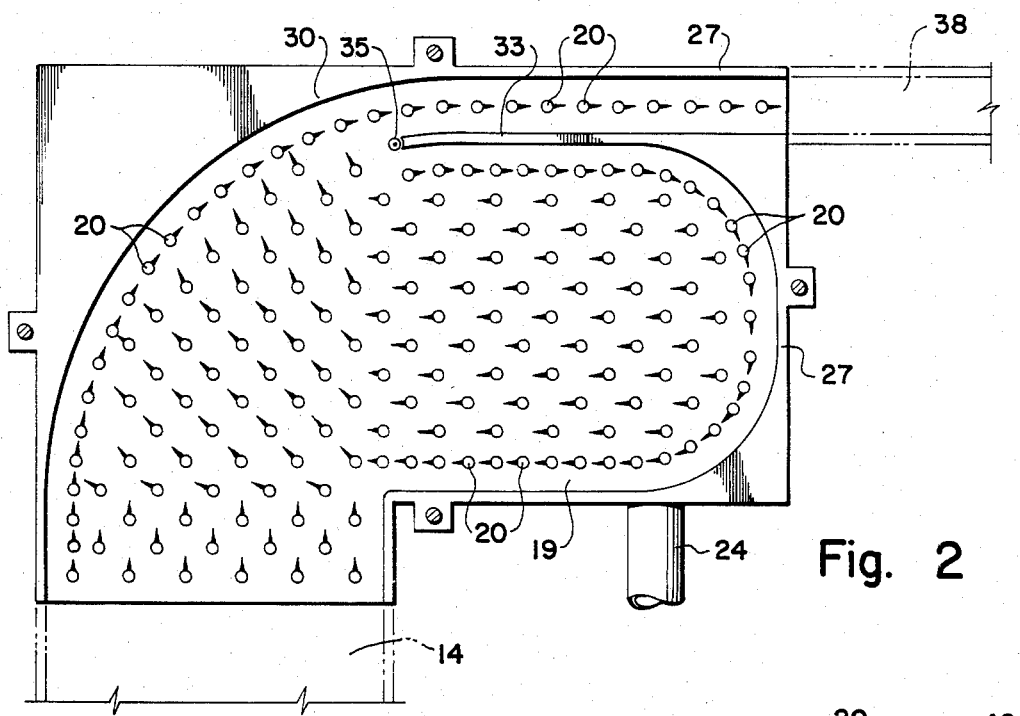
FIG. 2 is a top view of a plate member of the apparatus according to the invention as shown in FIG. 1.

As shown, articles 12, preferably thin walled cans, are carried in bulk on delivery means 14, which is usually a conveyor belt but may also be in the form of an air transport, swept plate, etc. from various sources, including can forming machinery or pallets of article 12. Delivery means 14 terminates immediately adjacent upper plenum 16 and lower plenum 17 each of which communicates through a plate member 19 having angle holes 20 therethrough and preferably arranged in a mirror image fashion. As shown in FIG. 2, angle holes 20 are oriented in various directions as indicated by the pointer portion of holes 20. The actual configuration of angle holes 20 will be described in more detail below. Upper pneumatic inlet 22 and lower pneumatic inlet 24 provide air under pressure to upper plenum 16 and lower plenum 17, respectively as shown in FIG. 1. In this manner a plurality of directed air flows are provided through plate members 19 to urge mass conveyed articles 12 into a desired single line arrangement. Plate members 19 are spaced a distance somewhat greater than the height of articles 12, but less than the diagonal dimension of articles 12 such that articles 12 are free to move between the plates, but are confined by plate members 19 to prevent tipping.

Lower edge barrier 27 and upper edge barrier 28, as shown in FIGS. 1 and 2, are arranged along the periphery of plate members 19 to confine articles 12 therebetween. However, adjacent arcuate edge barrier 30, angle holes 20 are positioned in a tangential and somewhat spaced relationship, i.e. preferably about half the diameter of articles 12, to urge articles 12 along arcuate edge barrier 30 in a single line fashion. Accordingly, articles 12 moving along arcuate edge barrier 30 are delivered between lower edge barrier 27, and single line barrier 33, as shown in FIG. 2. Other articles 12 not properly formed in the single line adjacent arcuate edge barrier 30 are split from such flow by, preferably, roller 35 and diverted away from lower edge barrier 27. As shown, the direction of angled holes 20 inboard of roller 35 are such to cause the articles 12 diverted by roller 35 to move in a recycling fashion to once again be presented at arcuate edge barrier 30.

Single file conveyor 38, which is of conventional construction and may be a conveyor belt, confined guide members operating under air pressure, gravity, etc. receive single file articles 12 for transport as desired.

Thus, as will be seen from FIGS. 1 and 2, articles 12 are presented between parallel spaced plate members 19 having angled holes 20 defined therethrough and oriented in such a fashion as to tend to urge articles 12 into contact with arcuate edge barrier 30 for formation and conveying between plate members 19 in a single file fashion. Articles 12 moved along with but not fully formed in the single file formation adjacent arcuate edge barrier 30 are split from the single file arrangement by roller 35, and moved by the air flow through angled holes 20 to be repositioned adjacent arcuate edge barrier 30 for subsequent formation into the desired single file arrangement. In this manner, intermittent delivery of articles 12 at a rate greater than that which can be formed and transported in a single file fashion is accomodated by dynamically storing articles 12 between plate members 19 for recycling into the single file arrangement as capacity becomes available. Once formed into the single file arrangement, angled holes 20 located between, as shown in FIG. 2, lower edge barrier 27 and single line barrier 33 cause such arrangement to be rapidly presented to single file conveyor 38.

Figure 3:
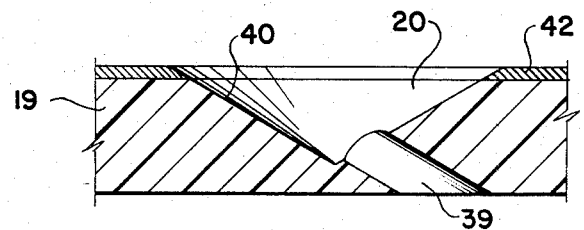
FIG. 3 is a sectioned view of an angled outlet in the plate member of FIG. 2.

With reference to FIG. 3, it will be noted that single hole 20 is formed preferably of a cylindrical bore 39 which communicates through an enlarged outlet 40. Thus as air flows from plenum 16 or 17 through angled holes 20, the angled air flow resulting will cause article 12 to travel in a direction corresponding to the angled outlet or angle hole 20.

Also, though optional, it is often desirable to line the surface of plate member 19 which contacts articles 12 with wear sheet 42, in order to provide a low friction, high wear surface which does not damage articles 12 during the rapid conveying action. Wear sheet 42 may be formed of metal, i.e., stainless steel, or plastics, such as polyearbonates as is well known in the art. Similarly, barriers 27, 28 and 33 as well as roller 35 are preferably formed of or coated with a material which will not scratch or abrade articles 12. Such materials are conventionally used and well known in the art. Included are polyearbonates, plexiglass sheets, stainless steel, teflon covered metal members, etc.

Figure 4:
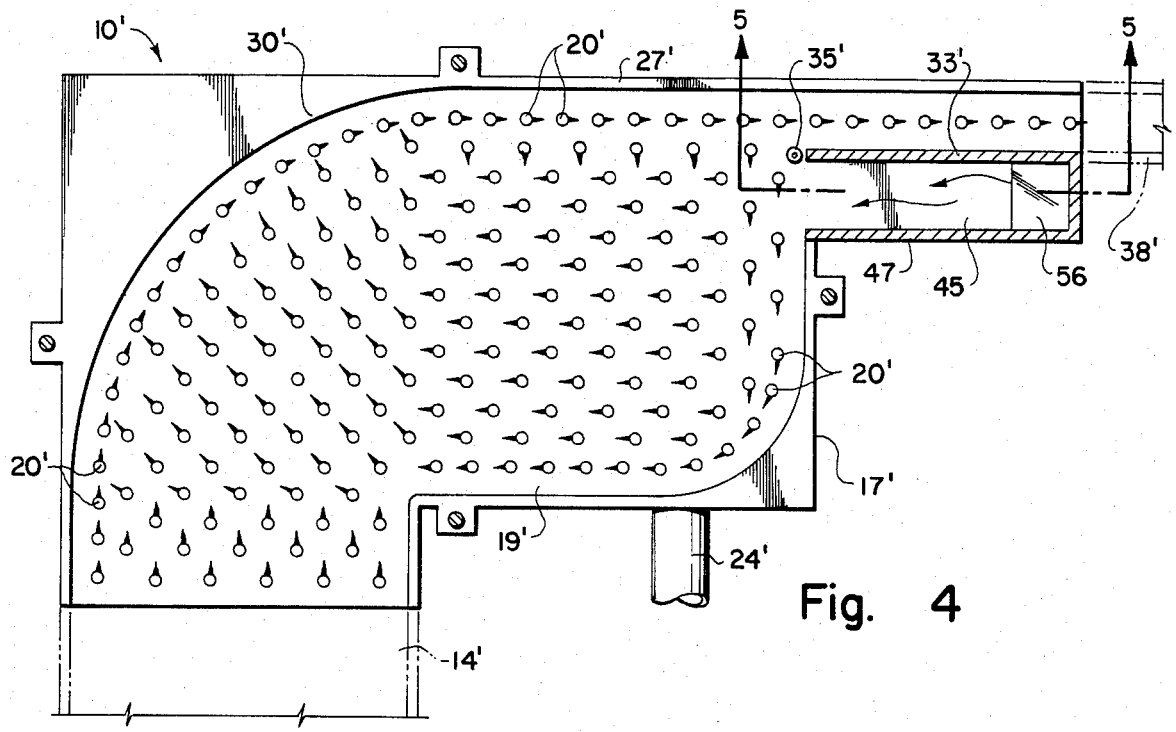
FIG. 4 is a view similar to that of FIG. 2 illustrating another embodiment of the invention.

Another embodiment of a single line apparatus in accord with the instant invention is illustrated in FIG. 4 and generally designated by reference numeral 10'. Apparatus 10' is in large part similar to apparatus 10 of FIG. 2 with the similar components identified by "prime" reference numerals in FIG. 4. However, air duct 45 defined by single line barrier 33' and wall 47 directs air flow from duct 45 towards roller 35' to pneumatically displace cans not fully formed into the single file row adjacent lower edge barrier 27'. Such air flow minimized the possibility of jamming.

Figure 5:
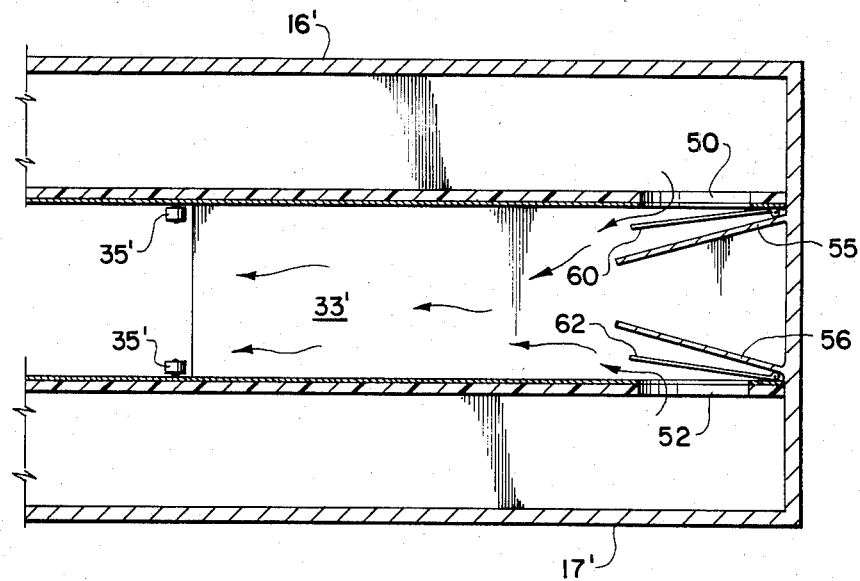
FIG. 5 is a section view along section line 5—5 of FIG. 4.

As shown in FIG. 5, vents 50 and 52 bleed air from plenums 16' and 17', respectively, past gates 50 and 62 which modulate the air flow. Limit members 55 and 56 confine gates 60 and 62 to a predetermined travel, though gates 60 and 62 are usually positioned at less than such predetermined travel.

In summary, the present invention as described in detail above utilizes a pair of spaced plate members which are sufficiently spaced to permit articles such as cans to fit therebetween when in an upright position, but more closely spaced than the diagonal dimension of the can to preclude tipping of the can while between the plate members. A plurality of preferably mirror imaged angled holes are defined through each plate member and oriented to direct air flow from adjacent plenums through the plate members in a pattern to urge the cans against a preferably arcuate barrier or guide. If desired, the hole pattern of the upper and lower plate members may differ. Angled holes adjacent the arcuate barrier are oriented in a direction tangential thereto to urge the cans along the arcuate guide in a single file manner, and then into a single file outlet. In the event that cans may not fully form into the single file arrangement adjacent the barrier, a splitting means, such as a roller and air jets, provided to divert such cans to a location between the plate members at which the angled holes as a result of airflow therethrough urge the cans into the single file arrangement.

In view of the many possible can sizes, conveyor rates, hole patterns and sized, working air pressures, etc., it will be recognized that no one configuration will be optimum. However, on the basis of the above disclosure, it has been found that excellent results are obtainable with but little experimentation when practiced by those skilled in the art.

Although only one preferred embodiment of the instant invention has been illustrated and described in detail, it will be clear that various changes and modifications which may be apparent to those skilled in the art are contemplated by the above disclosure, and that such changes and modifications may be made without departing from the scope of the invention, defined by the following claims.

What is claimed is:

1. Apparatus for forming mass conveyed similar cylindrical articles into a single file row, the apparatus comprising:

delivery means for conveying a plurality of cylindrical articles across the width thereof;

a pair of substantially horizontal plates spaced apart a distance greater than the height of the articles but less than the diagonal dimension thereof;

first barrier means positioned between said plates with said first barrier means having an arcuate central portion that extends between opposite first and second end portions, said first end portion of said first barrier means being adjacent to said delivery means and said arcuate central portion being positioned in the path of cylindrical articles received from said delivery means so that said cylindrical articles received at said arcuate central portion of said first barrier means are thereafter directed by said arcuate central portion in an arcuate path between said plates toward said second end portion of said first barrier means;

a plurality of angled holes defined through each of said plates with each hole being individually oriented relative to vertical at an angle less than normal to the plate and with a predetermined component in the horizontal direction of the plate, with the horizontal components of said holes adjacent said first barrier means being substantially parallel thereto in a common direction and with the horizontal components of others of said angled holes being oriented in directions toward different parts of said arcuate central portion of said first barrier means;

single file barrier means located parallel to and spaced from said second end portion of said first barrier means a distance which will admit one cylindrical article therebetween, said single file barrier means extending along a segment of said second end portion of said first barrier means in the common direction of the horizontal components of said adjacent holes; and air flow means communicating with the angled holes defined through each plate and adapted to conduct a pneumatic flow to and through the holes toward the volume between the plates whereby cylindircal articles conveyed from said delivery means between the plates will be urged toward said arcuate central portion of said first barrier means by pneumatic flow through said others of said angled holes and along said first barrier means by pneumatic flow through said angled holes adjacent to said first barrier means so that cylindrical articles are thereby passed in a single file between said second end portion of said first barrier means and said single file barrier means and thereafter discharged in single file therebetween.

2. Apparatus for forming single file rows as set forth in claim 1 which further includes a splitting means at the single file barrier means adjacent the first barrier means.

3. Apparatus for forming single file rows as set forth in claim 2 in which the splitting means comprise a roller rotatably mounted around a vertical axis adjacent the single file barrier means, and wherein said angled holes also include holes having a horizontal component oriented in a direction other than toward the arcuate central portion of said first barrier means so that pneumatic flow through said holes causes movement of the cylindrical articles away from the single file barrier means whereby cylindrical articles not formed into the single file may be split away from the single file row at the roller and moved between the plates in a direction to cause recycling toward the arcuate central portion of said first barrier means by said other angled holes.

4. Apparatus for forming single file rows as set forth in claim 1 in which the air flow means comprise a plenum formed adjacent the side of each plate opposite that facing the other plate, the plenum being adapted to convey air from a higher pressure source to the angled holes defined through the adjacent plate.

5. Apparatus for forming single file rows as set forth in claim 1 in which the angled holes adjacent the first barrier means are spaced from the first barrier means a distance substantially one half the diameter of the cylindrical article.

6. Apparatus for forming single file rows as set forth in claim 1 in which air flow means are included to direct an air flow adjacent the single file row at the single file barrier means and in a direction opposite to that of the movement of the single file row between the second end portion of said first barrier means and the single file barrier means.

7. Apparatus for forming single file rows as set forth in claim 1 in which the angled holes of each plate are positioned in mirror-image fashion relative to the opposite plate.

8. Apparatus for forming single file rows as set forth in claim 1 in which said delivery means includes an inlet conveyor, and in which each of said horizontal plates has both first barrier means and single file barrier means extending therefrom toward the other of said plates.

9. Apparatus for forming single file rows as set forth in claim 8 in which said apparatus also includes edge barrier means extending around the periphery of each plate at portions other than that occupied by said inlet conveyor and said first barrier means.

10. Apparatus for forming single file rows as set forth in claim 1 in which said angled holes in each said plate are oriented in a direction not less than 45 degrees from a line normal to the plates.

* * * * *